(12) United States Patent
Suemitsu et al.

(10) Patent No.: US 11,994,325 B2
(45) Date of Patent: May 28, 2024

(54) CONTROL DEVICE, REFRIGERATOR, CONTROL METHOD, AND ABNORMALITY DETECTION METHOD

(71) Applicant: MITSUBISHI HEAVY INDUSTRIES THERMAL SYSTEMS, LTD., Tokyo (JP)

(72) Inventors: Ryosuke Suemitsu, Tokyo (JP); Akimasa Yokoyama, Tokyo (JP); Takahiro Kono, Tokyo (JP); Yasushi Hasegawa, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 633 days.

(21) Appl. No.: 17/266,012

(22) PCT Filed: Jun. 18, 2019

(86) PCT No.: PCT/JP2019/024025
§ 371 (c)(1),
(2) Date: Feb. 4, 2021

(87) PCT Pub. No.: WO2020/035993
PCT Pub. Date: Feb. 20, 2020

(65) Prior Publication Data
US 2021/0302084 A1    Sep. 30, 2021

(30) Foreign Application Priority Data
Aug. 13, 2018 (JP) .................. 2018-152256

(51) Int. Cl.
*F25B 49/02* (2006.01)
*F04D 27/00* (2006.01)
(Continued)

(52) U.S. Cl.
CPC ............ *F25B 49/02* (2013.01); *F04D 27/001* (2013.01); *F25B 41/20* (2021.01); *F25B 41/31* (2021.01);
(Continued)

(58) Field of Classification Search
CPC .......... F25B 49/02; F25B 41/20; F25B 41/31; F25B 2400/0403; F25B 2400/06;
(Continued)

(56) References Cited

U.S. PATENT DOCUMENTS 6,772,599 B2 * 8/2004 Bodell, II ............. F25B 49/022
62/217

FOREIGN PATENT DOCUMENTS

| CN | 101469916 A | * | 7/2009 | ................ F24F 3/06 |
| JP | 2003307359 A | * | 10/2003 | |
| JP | 5543175 B2 | | 7/2014 | |

OTHER PUBLICATIONS

Translated_Young (Year: 2009).*
(Continued)

*Primary Examiner* — Elizabeth J Martin
*Assistant Examiner* — Samba Gaye
(74) *Attorney, Agent, or Firm* — Birch, Stewart, Kolasch & Birch, LLP

(57) ABSTRACT

The present invention provides a control device for detecting an abnormal operation state of a compressor in a parallel refrigerator. The control device is a control device for a refrigerator that includes a plurality of compressors connected in parallel, and detects occurrence of surging and occurrence of droplet suction on the basis of a deviation between values of currents flowing through electric motors that is configured to drive each of the plurality of compressors, and an operation point indicated by the air volume and the compression ratio of the plurality of compressors.

20 Claims, 6 Drawing Sheets

(51) Int. Cl.
*F25B 41/20* (2021.01)
*F25B 41/31* (2021.01)

(52) U.S. Cl.
CPC ... *F25B 2400/0403* (2013.01); *F25B 2400/06* (2013.01); *F25B 2500/06* (2013.01); *F25B 2600/2501* (2013.01); *F25B 2600/2513* (2013.01); *F25B 2700/151* (2013.01)

(58) Field of Classification Search
CPC ...... F25B 2600/2501; F25B 2600/2513; F25B 2700/15; F04D 27/001
See application file for complete search history.

(56) References Cited

OTHER PUBLICATIONS

Translated_Toshio (Year: 2003).*
International Search Report for International Application No. PCT/JP2019/024025, dated Sep. 24, 2019, with an English translation.
Written Opinion of the International Searching Authority for International Application No. PCT/JP2019/024025, dated Sep. 24, 2019, with an English translation.

* cited by examiner

CONTROL DEVICE, REFRIGERATOR, CONTROL METHOD, AND ABNORMALITY DETECTION METHOD

TECHNICAL FIELD

The present invention relates to a control device, a refrigerator, a control method, and an abnormality detection method.

Priority is claimed on Japanese Patent Application No. 2018-152256, filed on Aug. 13, 2018, the content of which is incorporated herein by reference.

BACKGROUND ART

In a parallel refrigerator provided with a plurality of compressors connected in parallel, it is desired that a refrigerant air volume of each compressors is approximately the same. However, actually, a difference occurs in the refrigerant air volume in each compressor. In a case where the difference exceeds a permissible range, there is a possibility that surging occurs in a compressor whose refrigerant air volume is small.

A refrigerant flow rate of the compressor is related to a current of an electric motor that drives the compressor (hereinafter, there is a case of being simply referred to as a current value of the compressor). For example, in a case where there is a large difference in current values between the two compressors, there is a possibility that surging occurs in one of the compressors. In a case where it is determined that the surging occurs in one of the compressors, a protection operation of suppressing the surging is performed by flowing a vapor phase refrigerant through a hot gas bypass that connects together a discharge side and a suction side of the compressors, and increasing the refrigerant air volume in the one compressor.

Patent Document 1 discloses a surging detection device which determines that surging occurs in a case where a change rate of an operating current of an electric motor that drives a compressor is out of a permissible range.

CITATION LIST

Patent Literature

Patent Document 1

Japanese Patent No. 5543175

SUMMARY OF INVENTION

Technical Problem

However, in a case where it is determined that surging occurs based on only a fact that there is a difference exceeding a permissible range between current values of a plurality of compressors, false detection is performed in which the surging occurs even in a case where a deviation occurs between the current values due to a cause other than the surging, so that there is a possibility that an unnecessary protection operation is performed.

The present invention provides a control device, a refrigerator, a control method, and an abnormality detection method capable of solving the above-described problems.

Solution to Problem

According to one aspect of the present invention, there is a provided a control device for a refrigerator provided with a plurality of compressors connected in parallel, in which the control device is configured to detect occurrence of surging and occurrence of droplet suction on the basis of a deviation between values of currents flowing through electric motors that is configured to drive each of the plurality of compressors, and an operation point indicated by an air volume and a compression ratio of the plurality of compressors.

According to the aspect of the present invention, in the control device, the control device is configured to determine that the surging occurs at a part of the plurality of compressors in a case where the deviation between the values of currents is equal to or larger than a predetermined threshold value and the operation point indicates that the air volume is smaller than a predetermined reference.

According to the aspect of the present invention, in the control device, the refrigerator is configured to include a bypass pipe that connects together a discharge side and a suction side of the plurality of compressors, and a bypass valve that is provided in the bypass pipe, and, in a case where the occurrence of the surging is detected, control to open the bypass valve is performed.

According to the aspect of the present invention, in the control device, in a case where a state in which the deviation between the values of currents is equal to or larger than the predetermined threshold value continues even though a predetermined time elapses after the occurrence of the surging is detected, the control to open the bypass valve is stopped.

According to the aspect of the present invention, in the control device, the control device is configured to determine that the droplet suction occurs at a part of the plurality of compressors from an evaporator provided in the refrigerator in a case where the deviation between the values of currents is equal to or larger than the predetermined threshold value and the operation point indicates that the air volume is larger than the predetermined reference.

According to the aspect of the present invention, in the control device, the control device is configured to maintain a current operation until the deviation between the values of currents becomes smaller than the predetermined threshold value in a case where the occurrence of the droplet suction is detected.

According to the aspect of the present invention, in the control device, the control device is configured to decrease an opening degree of an expansion valve included in the refrigerator in a case where the deviation between the values of currents does not become smaller than the predetermined threshold value even though a predetermined time elapses after the occurrence of the droplet suction is detected.

According to the aspect of the present invention, there is provided a control device for a refrigerator provided with a plurality of compressors connected in parallel, in which the control device is configured to determine that surging occurs in a part of the plurality of compressors in a case where a deviation between values of currents flowing through electric motors that is configured to drive each of the plurality of compressors, is equal to or larger than a predetermined threshold value, and an operation point indicated by the air volume and the compression ratio of the plurality of compressors indicates that the air volume is smaller than a predetermined reference.

According to the aspect of the present invention, there is provided a control device for a refrigerator provided with a plurality of compressors connected in parallel, in which the control device is configured to determine that droplet suction occurs in a part of the plurality of compressors from an evaporator provided in the refrigerator in a case where a deviation between values of currents flowing through electric motors that is configured to drive each of the plurality of compressors, is equal to or larger than a predetermined threshold value, and an operation point indicated by an air volume and a compression ratio of the plurality of compressors indicates that the air volume is larger than a predetermined reference.

According to the aspect of the present invention, there is provided a refrigerator provided with a plurality of compressors connected in parallel, the refrigerator including any of the control device.

According to another aspect of the present invention, there is provided a control method for a refrigerator provided with a plurality of compressors connected in parallel, the control method including acquiring values of currents flowing through electric motors that is configured to drive each of the plurality of compressors, calculating an operation point indicated by an air volume and a compression ratio of the plurality of compressors, detecting occurrence of surging or droplet suction on the basis of a deviation between a plurality of the values of currents and the operation point, performing a predetermined surging protection operation in a case where the occurrence of the surging is detected, and maintaining a current operation state in a case where the droplet suction is detected.

According to still another aspect of the present invention, there is provided an abnormality detection method for a refrigerator provided with a plurality of compressors connected in parallel, the abnormality detection method including acquiring values of currents flowing through electric motors that is configured to drive each of the plurality of compressors, calculating an operation point indicated by an air volume and a compression ratio of the plurality of compressors, and determining that surging occurs in a part of the plurality of compressors in a case where a deviation between a plurality of the values of currents is equal to or larger than a predetermined threshold value and the operation point indicates that the air volume is smaller than a predetermined reference.

According to still another aspect of the present invention, there is provided an abnormality detection method for a refrigerator provided with a plurality of compressors connected in parallel, the abnormality detection method including acquiring values of currents flowing through electric motors that is configured to drive each of the plurality of compressors, calculating an operation point indicated by an air volume and a compression ratio of the plurality of compressors, and determining that droplet suction occurs in a part of the plurality of compressors in a case where a deviation between a plurality of the values of currents is equal to or larger than a predetermined threshold value and the operation point indicates that the air volume is larger than a predetermined reference.

Advantageous Effects of Invention

According to the control device, the refrigerator, the control method, and the determination method described above, a surging detection accuracy is improved, so that it is possible to prevent an unnecessary surging protection control operation.

DESCRIPTION OF EMBODIMENTS

Embodiment

Hereinafter, an abnormality detection process of a compressor in a parallel refrigerator according to an embodiment of the present invention and control performed when abnormality detection is performed will be described with reference to FIGS. 1 to 6.

Figure 1:
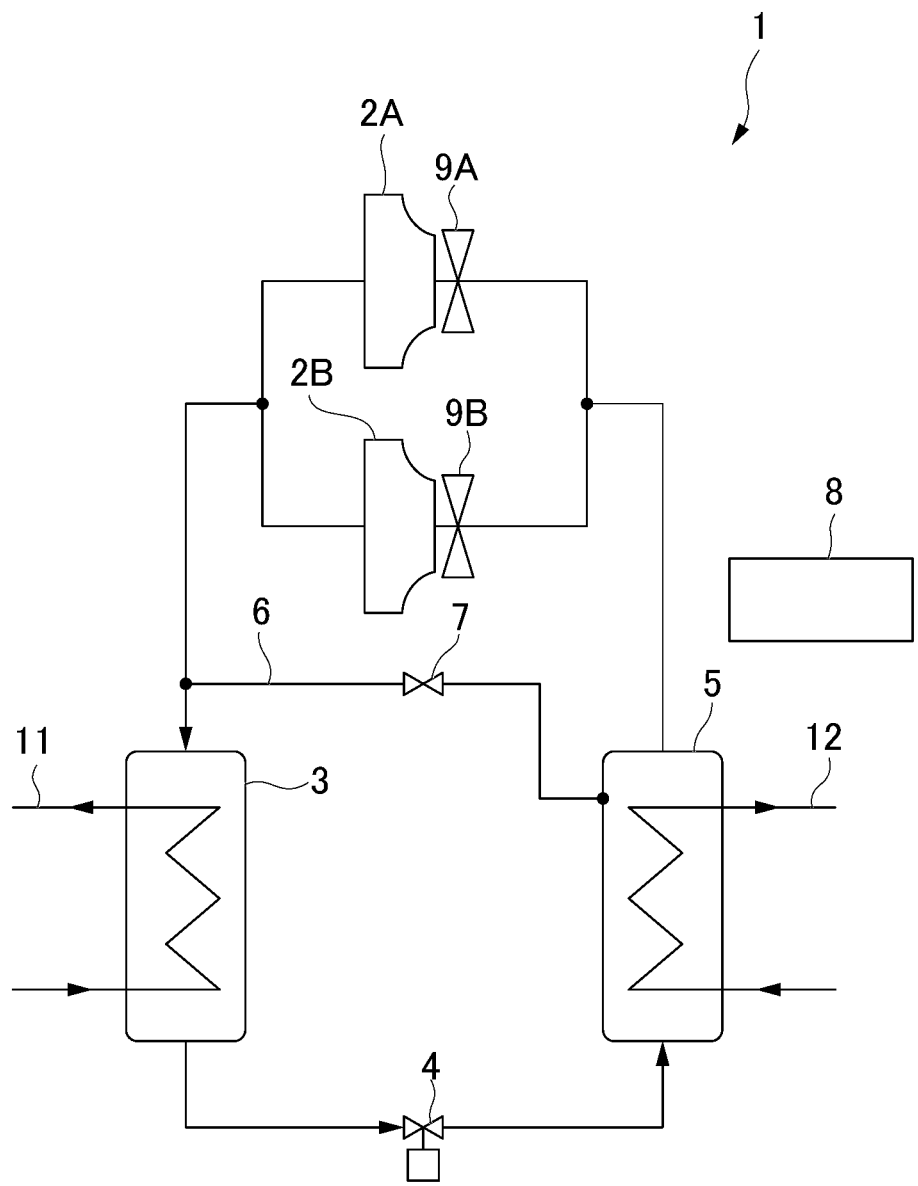
FIG. 1 is a schematic configuration diagram showing an example of a refrigerator according to an embodiment of the present invention.

FIG. 1 is a schematic configuration diagram showing an example of a refrigerator according to the embodiment of the present invention. As represented in FIG. 1, the refrigerator 1 according to the present embodiment includes compressors 2A and 2B connected in parallel, a condenser 3, an expansion valve 4, an evaporator 5, a bypass pipe 6, a bypass valve 7, and a control device 8. In the refrigerator 1, the compressors 2A and 2B, the condenser 3, the expansion valve 4, and the evaporator 5 are connected to form a refrigerant circuit.

In the refrigerator 1 represented in FIG. 1, although the two compressors 2A and 2B are connected in parallel, the number of compressors may be equal to or larger than three in a case of a configuration in which a plurality of compressors are connected in parallel. A configuration may be provided in which a plurality of compressors connected in series are connected in parallel to a plurality of other compressors connected in series. In the present embodiment, although one bypass pipe 6 is provided for the two compressors 2A and 2B, a configuration may be provided in which the bypass pipe 6 is provided for each of the compressors 2A and 2B.

The compressors 2A and 2B compress a refrigerant and discharge a high-temperature and high-pressure refrigerant. Vanes 9A and 9B are provided on suction sides of the compressors 2A and 2B, respectively. The vanes 9A and 9B are controlled by the control device 8 to adjust a refrigerant air volume flowing from the evaporator 5 to the compressor 2. The compressors 2A and 2B are respectively connected to electric motors (not shown) and are driven by the respective electric motors. The control device 8 controls rotational speeds of the compressors 2A and 2B (rotational speeds of the electric motors) by controlling currents of the respective electric motors, and supplies the refrigerant according to loads to the refrigerant circuit. In a case where the two compressors 2A and 2B are connected in parallel, it is possible to increase the capacity of the entire compressor 2.

In a case where it is not necessary to distinguish between the compressors 2A and 2B, there is a case of being described as the compressor 2. There is a case where the vanes 9A and 9B are described as a vane 9. The current of the electric motor that drives the compressor 2A is set as a current value Ia, and the current of the electric motor that drives the compressor 2B is set as a current value Ib.

The refrigerant discharged by the compressors 2A and 2B is supplied to the condenser 3. The condenser 3 condenses the high-temperature and high-pressure refrigerant. A pipe 11 is connected to the condenser 3, and cooling water is supplied to the pipe 11 from a cooling tower or the like. In the condenser 3, the refrigerant exchanges heat with cooling water flowing through the pipe 11. The refrigerant is condensed by dissipating heat to cooling water. The refrigerant condensed by the condenser 3 is decompressed by the expansion valve 4. The decompressed low-pressure refrigerant is supplied to the evaporator 5. The evaporator 5 evaporates the low-pressure refrigerant. A pipe 12 is connected to the evaporator 5, and cold water is supplied to the pipe 12 from a load side. In the evaporator 5, the refrigerant exchanges heat with cold water flowing through the pipe 12. The refrigerant cools cold water supplied to the load side, and is vaporized by absorbing heat from cold water. The vaporized vapor phase refrigerant is inhaled into the compressors 2A and 2B, and is compressed again by the compressors 2A and 2B. The subsequent refrigerant flow is as described above. The refrigerant circulates in the refrigerant circuit in this way. The bypass pipe 6 is a refrigerant pipe that connects together a discharge side and a suction side of the compressor 2. Specifically, one end of the bypass pipe 6 is connected to the discharge side of the compressor 2, that is, an upstream of a refrigerant flow of the condenser 3, and the other end is connected to a vapor phase portion (space where the vapor phase refrigerant exists) of the evaporator 5 provided on a suction side of the compressor 2. That is, the bypass pipe 6 is formed to bypass flow paths of the condenser 3, the expansion valve 4, and the evaporator 5, through which the refrigerant discharged by the compressor 2 flows.

The bypass pipe 6 is provided with a bypass valve 7 for adjusting the refrigerant air volume flowing through the bypass pipe 6. The bypass valve 7 is an adjustment valve whose opening degree can be adjusted, and the control device 8 controls an opening degree of the bypass valve 7. In a case where the bypass valve 7 is opened, the vapor phase refrigerant discharged by the compressor 2 passes through the vapor phase portion of the evaporator 5 via the bypass pipe 6 and is supplied to the suction side of the compressor 2. That is, in a case where the bypass valve 7 is opened to increase the amount of refrigerant flowing through the bypass pipe 6, it is possible to increase the amount of vapor phase refrigerant supplied to the compressor 2. The bypass pipe 6 is also called a hot gas bypass, and the bypass valve 7 is also called a hot gas bypass valve.

Surging occurs in the compressor 2 due to a decrease in a flow rate of the refrigerant flowing through the compressor 2. In a case where the surging occurs in the compressor 2, the bypass valve 7 is opened, and the vapor phase refrigerant discharged by the compressor 2 is supplied to the suction side of the compressor 2 via the bypass pipe 6. Therefore, the refrigerant air volume in the compressor 2 increases, and it is possible to eliminate the surging. This control is called a surging protection operation. In the present embodiment, although the bypass valve 7 is described as a flow rate adjustment valve, the bypass valve 7 may be simply an on-off valve.

There is a case where a large difference occurs in the refrigerant air volume between the compressors 2A and 2B while the refrigerator 1 is in operation or immediately after being started. At this time, for example, it is assumed that the refrigerant air volume of the compressor 2A is sufficiently large and the refrigerant air volume of the compressor 2B is smaller than a predetermined value. In this case, there is a possibility that the surging occurs in the compressor 2B whose refrigerant air volume is small. The difference in the refrigerant air volume between the compressors 2A and 2B appears as a difference between the current value Ia of the electric motor that drives the compressor 2A and the current value Ib of the electric motor that drives the compressor 2B. In a case of the surging, the current value Ib of the compressor 2B, in which the air volume is decreased, decreases. With this property, a control device is provided, which determines that the surging occurs based on a fact that a deviation between the current values Ia and the current value Ib is equal to or larger than a predetermined threshold value, and performs the surging protection operation (open the bypass valve 7), from the related art.

However, it is not limited that the deviation between the current value Ia and the current value Ib, which is equal to or larger than the predetermined threshold value, necessarily indicates occurrence of the surging. For example, a liquid level is not limited to be horizontal and uniform inside the evaporator 5, and there is a case where a height of the liquid level is uneven or waved. For example, in a case where it is assumed that the liquid level on a side of the pipe connected to the compressor 2B is high, a flow of the vapor phase refrigerant supplied to the compressor 2B washes over a liquid level surface of the evaporator 5, so that liquid phase refrigerant scatters. In a case where the refrigerant air volume is large, the scattered liquid phase refrigerant is carried by being mixed with the vapor phase refrigerant, so that a phenomenon occurs in which a large amount of liquid phase refrigerant is supplied to the compressor 2B, as compared with the compressor 2A. Then, in the compressor 2B, droplet suction from the evaporator 5 occurs. In a case where large amount of liquid phase refrigerant is sucked, a load of the compressor 2B increases and the current value Ib increases. On the other hand, it is assumed that the liquid level on a side of the compressor 2A is relatively low and the refrigerant supplied to the compressor 2A is almost the vapor phase refrigerant. Then, in the compressor 2A, the droplet suction does not occur and the current value Ia does not rise. As described above, in the parallel refrigerator, there is a case where the droplet suction occurs only at a part of the compressors. Even in such a situation, there is a case where the deviation between the current values Ia and Ib flowing through the electric motors of the compressors 2A and 2B is large and the deviation between the current value Ia and the current value Ib becomes equal to or larger than the predetermined threshold value. In a case where this phenomenon is determined to be the surging and the surging protection operation is performed, there is a possibility of promoting the droplet suction in the compressor 2B. A reason for this will be explained below.

As described above, the other end of the bypass pipe 6 is connected to the vapor phase side of the evaporator 5. In a case where the bypass valve 7 is opened by the surging protection operation and the vapor phase refrigerant discharged by the compressor 2 is guided to the bypass pipe 6, the refrigerant air volume passing through the evaporator 5 increases. In a case where the refrigerant air volume increases as described above, the amount of liquid phase refrigerant carried to the compressor 2 increases, together with the vapor phase refrigerant. That is, in a case where the surging protection operation is performed, the refrigerant air volume passing through the vapor phase portion of the evaporator 5 increases, so that the amount of liquid phase refrigerant carried to the compressor 2B also increases, and the droplet suction is promoted. It is desirable for the compressor 2 to inhale the vapor phase refrigerant. Therefore, in a case where the surging protection operation is performed in a case where the droplet suction occurs, a situation for the compressor 2 is deteriorated (the amount of liquid phase refrigerant increases).

In order to solve the problem, the control device 8 of the present embodiment checks an operation state of the compressor 2 by comparing, in addition to the deviation between the current values of the compressor 2, an operation point of the compressor 2 in operation with a characteristic curve (pressure ratio-air volume curve) of the compressor 2, and distinguishes whether the surging occurs or the droplet suction occurs.

The respective electric motors that drive the compressors 2A and 2B are provided with not-shown ammeters (an ammeter a and an ammeter b). The ammeters a and b measure the current values Ia and Ib of the electric motors. The refrigerant circuit of the refrigerator 1 is provided with not-shown various sensors illustrated below. Specifically, there are provided a thermometer (first sensor) that measures an inlet temperature of cold water flowing through the pipe 12 of the evaporator 5, a thermometer (second sensor) that measures an outlet temperature of cold water, a flowmeter (third sensor) that measures the flow rate of cold water, a pressure gauge (fourth sensor) that measures pressure of the refrigerant in the evaporator 5, a thermometer (fifth sensor) that measures a temperature of the refrigerant on an upstream of a refrigerant flow of the expansion valve 4, and the like.

Figure 2:
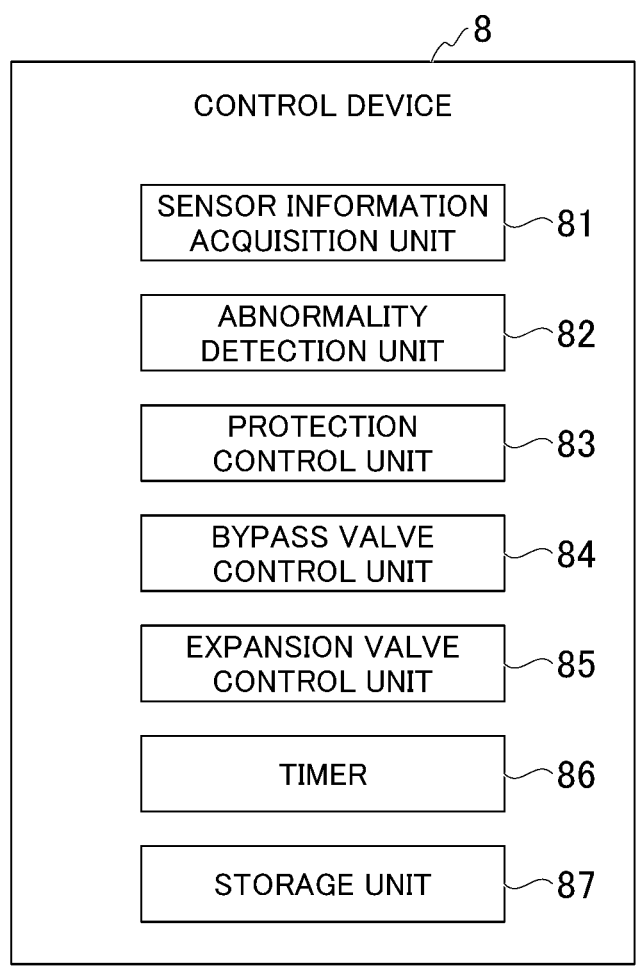
FIG. 2 is a block diagram showing an example of a control device according to the embodiment of the present invention.

FIG. 2 is a block diagram showing an example of the control device according to the embodiment of the present invention.

The control device 8 is, for example, a computer device such as a microcomputer. The control device 8 is connected to the ammeter a, the ammeter b, and the first sensor to the fifth sensor, which are not represented. As represented in FIG. 2, the control device 8 includes a sensor information acquisition unit 81, an abnormality detection unit 82, a protection control unit 83, a bypass valve control unit 84, an expansion valve control unit 85, a timer 86, and a storage unit 87. Although the control device 8 performs various controls related to the refrigerator 1, in the specification, functions related to the abnormality detection process of the compressor 2 and control when an abnormality is detected are described, and the other functions will not be described.

The sensor information acquisition unit 81 acquires measured values (sensor information) measured by the respective sensors from the ammeter a, the ammeter b, and first sensor to the fifth sensor.

The abnormality detection unit 82 detects an abnormal operation state that occurs in the compressors 2A and 2B using the sensor information acquired by the sensor information acquisition unit 81. In the present embodiment, the abnormal operation state is the surging and the droplet suction. Specifically, the abnormality detection unit 82 detects that the surging or the droplet suction occurs in any one of the compressors 2A and 2B based on the deviation of the current values Ia and Ib and the operation point of the compressor 2 calculated using the first sensor to the fifth sensor.

In a case where the abnormality detection unit 82 detects the abnormal operation state of the compressor 2, the protection control unit 83 executes control according to the operation state, returns the operation state of the compressor 2 to a normal state, and performs control to prevent failure or the like of the compressor 2.

The bypass valve control unit 84 adjusts the opening degree of the bypass valve 7. For example, in a case where the abnormality detection unit 82 detects the occurrence of the surging, the bypass valve control unit 84 performs control to open the bypass valve 7 based on an instruction from the protection control unit 83.

The expansion valve control unit 85 adjusts an opening degree of the expansion valve 4. For example, in a case where the abnormality detection unit 82 detects the occurrence of the droplet suction, the expansion valve control unit 85 performs control to close the expansion valve 4 based on the instruction from the protection control unit 83.

The timer 86 measures time.

The storage unit 87 stores various information such as the sensor information acquired by the sensor information acquisition unit 81 and the threshold value used to determine whether or not being in the abnormal operation state.

Next, the abnormality detection process by the abnormality detection unit 82 will be described. As described above, the currents Ia and Ib indicate the operation states of the compressors 2A and 2B. In a case where the current flowing through the electric motor increases, the compression capacity of the compressor 2 rises, and, in a case where the current decreases, the compression capacity of the compressor 2 decreases. For example, in a case where the surging occurs in the compressor 2B, the refrigerant air volume is small in the compressor 2B, so that the compression capacity is low and the current value Ib decreases. Therefore, in a case where the surging occurs in one of the compressors 2, the deviation between the current values Ia and Ib becomes large. However, as in the case where the droplet suction occurs in the compressor 2B, there is a case where the deviation increases as the current value Ib increases. Therefore, it is not possible to accurately detect the surging and the droplet suction only by the deviation between the current value Ia and the current value Ib. Therefore, the abnormality detection unit 82 detects the abnormal operation state of the compressor 2 by using the characteristic curve of the compressor 2 in addition to the current values Ia and Ib.

Figure 3:
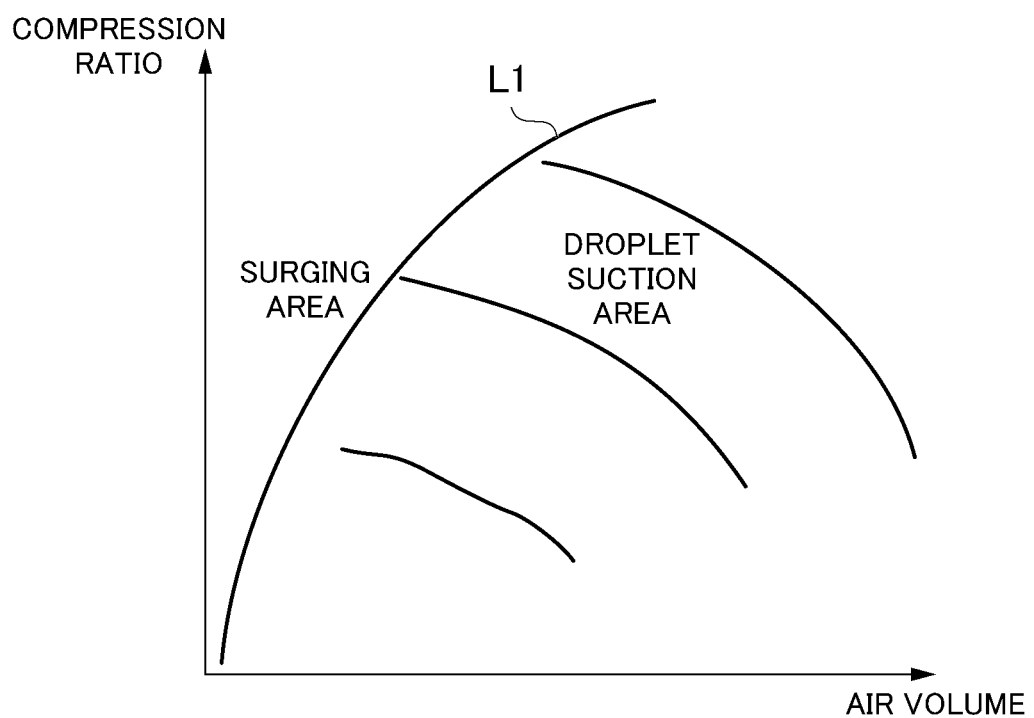
FIG. 3 is a graph showing an abnormality detection process according to the embodiment of the present invention.

FIG. 3 is a graph showing the abnormality detection process according to the embodiment of the present invention. The abnormality detection by the abnormality detection unit 82 using the characteristic curve of the compressor 2 will be described with reference to FIG. 3.

An example represented in FIG. 3 is a characteristic curve L1 of compression ratio-air volume of the compressor 2. A vertical axis of the graph of FIG. 3 is the compression ratio of the compressor 2, and a horizontal axis is the refrigerant air volume. The characteristic curve L1 represents an operation point that is a boundary between the surging and the droplet suction in the relationship between the compression ratio and the refrigerant air volume of the compressor 2. The characteristic curve L1 is calculated by performing a verification experiment or the like in advance for each compressor 2, and is registered in the storage unit 87.

The surging is an abnormal operation state that occurs when the refrigerant air volume decreases in the compressor 2. When the operation point of the compressor 2 has a relationship between the compression ratio and the air volume, which is included in an area on a left side of the characteristic curve L1, that is, when the refrigerant air volume is small, there is a high possibility that the surging occurs. The area on the left side of the characteristic curve L1 is called a surging area.

The droplet suction is an abnormal operation state which easily occurs when the refrigerant air volume is large. In a case where the refrigerant air volume is small, it is difficult for the liquid phase refrigerant to be scattered in the evaporator 5. Further, since the air volume is small, it is difficult for the liquid phase refrigerant to be carried. Therefore, the liquid phase refrigerant inhaled into the compressor 2 is reduced. When the operation point of the compressor 2 has a relationship between the compression ratio and the air volume, which is included in an area on a right side of the characteristic curve L1, that is, when the refrigerant air volume is large, there is a high possibility that the droplet suction occurs. The area on the right side of the characteristic curve L1 is called a droplet suction area.

A function a is registered in the storage unit 87. The function a is a function of outputting the compression ratio and the refrigerant air volume in the compressor 2 in a case where the inlet temperature and the outlet temperature of cold water cooled by the evaporator 5, the cold water flow rate, the refrigerant pressure of the evaporator 5, and a refrigerant temperature on the upstream of the expansion valve 4 are input. The abnormality detection unit 82 inputs the sensor information measured by the first sensor to the fifth sensor into the function a, and acquires the compression ratio and the refrigerant air volume, which are output by the function a, of the compressor 2. The abnormality detection unit 82 compares the relationship between the current operation point, which is indicated by the compression ratio and the refrigerant air volume based on the function a, of the compressor 2 and the characteristic curve L1, and determines whether the operation point of the compressor 2 belongs to the surging area or the droplet suction area.

(Detection of Surging)

In a case where the deviation between the current value Ia and the current value Ib is equal to or larger than a predetermined threshold value β and the operation point of the compressor 2 belongs to the surging area, the abnormality detection unit 82 determines that surging occurs in any of the compressor 2A and the compressor 2B. The threshold value β is a threshold value for determining that the compressor 2 becomes the abnormal operation state, and is a value confirmed by the verification experiment or the like in advance.

(Detection of Droplet Suction)

In a case where the deviation between the current value Ia and the current value Ib is equal to or larger than the predetermined threshold value β and the operation point of the compressor 2 belongs to the droplet suction area, the abnormality detection unit 82 determines that the droplet suction occurs in any of the compressor 2A or the compressor 2B.

In a case where the abnormality detection unit 82 detects the abnormal operation state of the compressor 2, the protection control unit 83 corrects the abnormal operation state of the compressor 2 and performs control to protect the compressor 2 from failure or the like. Next, the abnormality detection process by the control device 8 and the control performed when the abnormality occurs will be described with reference to FIG. 4 using the configurations represented in FIGS. 1 to 3 as examples.

Figure 4:
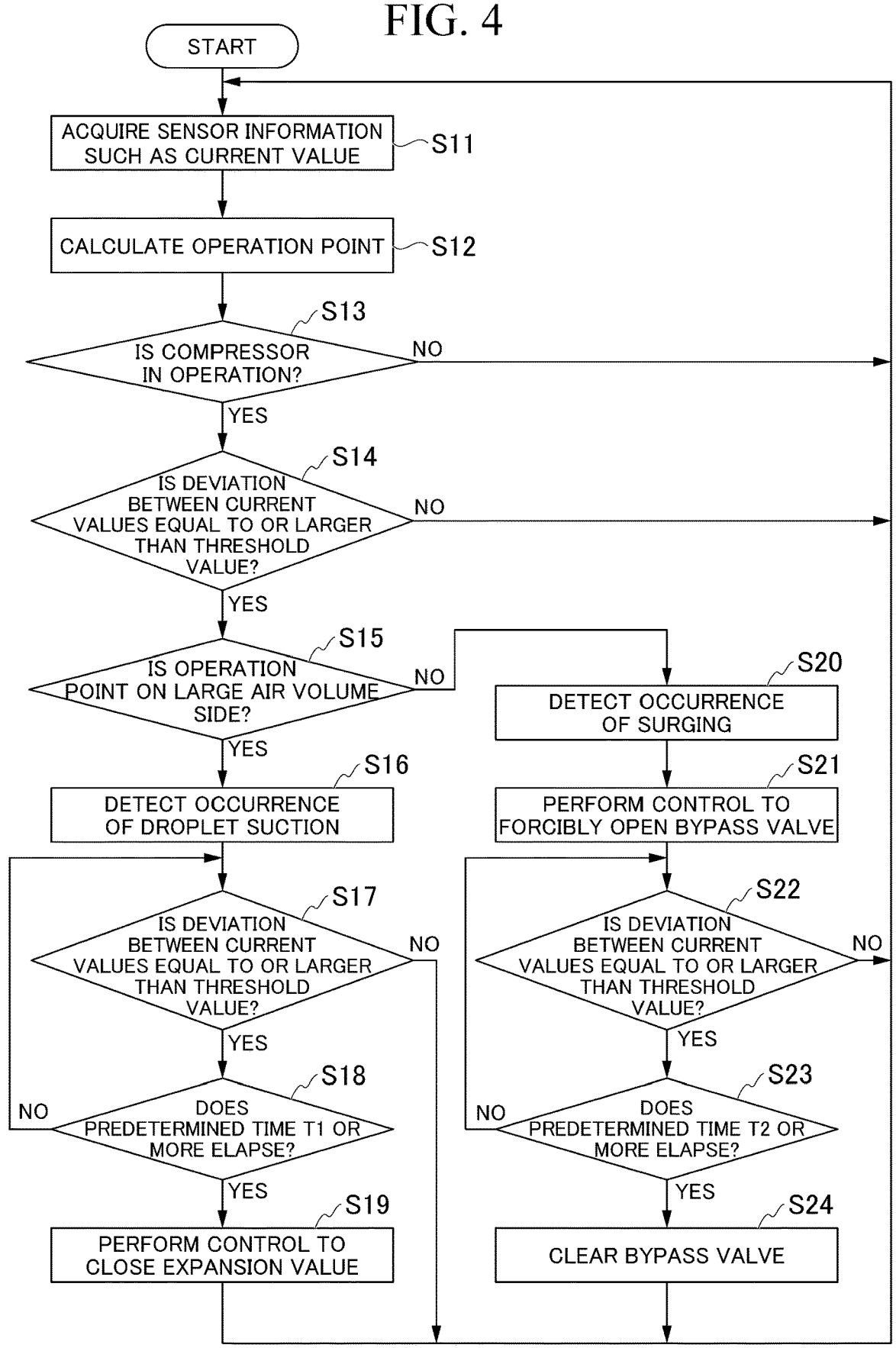
FIG. 4 is a flowchart showing an example of an abnormality detection process by the control device according to the embodiment of the present invention, and control performed when abnormality detection is performed.

FIG. 4 is a flowchart showing an example of an abnormality detection process by the control device according to the embodiment of the present invention and control when abnormality detection is performed.

First, the sensor information acquisition unit 81 acquires the sensor information such as the current values (step S11). Specifically, the sensor information acquisition unit 81 acquires the current values Ia and Ib measured by the ammeter a and the ammeter b. The sensor information acquisition unit 81 acquires the measured values measured by the first sensor to the fifth sensor. The sensor information acquisition unit 81 continues to acquire the sensor information at predetermined time intervals.

Next, the abnormality detection unit 82 calculates the operation point (step S12). Specifically, the abnormality detection unit 82 calculates the refrigerant air volume and the compression ratio of the compressor 2 based on the cold water inlet temperature, the cold water outlet temperature, the cold water flow rate, the refrigerant pressure at the evaporator 5, the refrigerant temperature at an outlet of the evaporator 5, the refrigerant temperature on the upstream of the expansion valve 4, and the function a stored in the storage unit 87, which are acquired by the sensor information acquisition unit 81.

Next, the control device 8 determines whether or not the compressor 2 is in operation (step S13). In a case where the compressor 2 is in operation (step S13; Yes), the processes subsequent to step S14 are performed. In a case where the compressor 2 is not in operation (step S13; No), the processes subsequent to step S11 are repeated.

Next, the abnormality detection unit 82 determines whether or not the absolute value (|Ia−Ib|) of the deviation between the current values Ia and Ib is equal to or larger than the threshold value β (step S14). In a case where the absolute value of the deviation between the current values Ia and Ib is smaller than the threshold value β (step S14; No), the processes subsequent to step S11 are repeated.

In a case where the absolute value of the deviation between the current values Ia and Ib is equal to or larger than the threshold value β (step S14; Yes), the abnormality detection unit 82 determines whether or not the operation point calculated in step S12 is on a large air volume side (step S15). Specifically, the abnormality detection unit 82 determines a side, on which the operation point is located, of the characteristic curve L1 (FIG. 3) of the compressor 2 stored in the storage unit 87. In a case where the operation point is located in the surging area, the abnormality detection unit 82 determines that the operation point is not on the large air volume side. In a case where the operation point is located in the droplet suction area, the abnormality detection unit 82 determines that the operation point is on the large air volume side. In a case where it is determined that the operation point is on the large air volume side (step S15; Yes), the abnormality detection unit 82 detects occurrence of droplet suction (step S16). In this case, it is presumed that the droplet suction occurs in any of the compressors 2. The control device 8 (protection control unit 83) performs control in steps S17 to S19 described below.

In a case where it is determined that the operation point is not on the large air volume side (step S15; No), the abnormality detection unit 82 detects the occurrence of the surging (step S20). In this case, it is presumed that the surging occurs in any of the compressors 2. The control device 8 (protection control unit 83) controls steps S21 to S24 described below.

(Control when Droplet Suction is Detected)

In a case where the abnormality detection unit 82 detects the occurrence of droplet suction, the protection control unit 83 performs follow-up observation until a predetermined time elapses. Specifically, the protection control unit 83 determines, for example, whether or not a state, in which the absolute value of the deviation between the current values Ia and Ib acquired by the sensor information acquisition unit 81 is equal to or larger than the threshold value β, continues at predetermined time intervals (step S17). In a case where the absolute value of the deviation between the current values Ia and Ib is smaller than the threshold value β (step S17; No), the protection control unit 83 determines that a droplet suction operation state in the compressor 2 is eliminated. Since the abnormal operation state is eliminated, the control device 8 repeats the processes subsequent to step S11.

In a case where the absolute value of the deviation between the current values Ia and Ib is equal to or larger than the threshold value β (step S17; Yes), the protection control unit 83 refers to the timer 86, and determines whether or not a predetermined time T1 elapses after the occurrence of droplet suction is detected by the abnormality detection unit 82 (step S18). In the predetermined time T1, a time, which is required until being stable when cold water and cooling water become unstable states due to, for example, disturbance, is set. In a case where the predetermined time T1 does not elapse (step S18; No), processes subsequent to step S17 are repeated. In a case where the predetermined time T1 elapses (step S18; Yes) and the droplet suction continues even though the predetermined time T1 elapses, it is considered that the air volume is excessive, so that the protection control unit 83 instructs the expansion valve control unit 85 to perform close control on the expansion valve 4. The expansion valve control unit 85 performs control to close the expansion valve 4 (step S19). The opening degree of the expansion valve 4 at this time is set in a range in which the droplet suction is suppressed and an influence on an operation state or the load of the refrigerator 1 is sufficiently small. A value determined in advance by an experiment or the like is applied to the opening degree of the expansion valve 4. The protection control unit 83 performs the same determination as in step S17 even after the opening degree of the expansion valve 4 is decreased, and, in a case where the absolute value of the deviation between the current values Ia and Ib returns to be smaller than the threshold value β, the protection control unit 83 returns the opening degree of the expansion valve 4 to an original opening degree.

The process of performing the close control on the expansion valve 4 in step S19 is not essential. The protection control unit 83 may continue the follow-up observation (the current operation state is maintained while monitoring the deviation of the current values Ia and Ib) until a droplet suction state is suppressed. For example, in a case where the opening degree of the expansion valve 4 is changed and a strong influence occurs on the operation state of the refrigerator 1, the follow-up observation may be continued. Alternatively, in a case where the absolute value of the deviation between the current values Ia and Ib does not return to be smaller than the threshold value β, the protection control unit 83 may notify an alarm or the like instead of performing the close control on the expansion valve 4.

In general, the operation state, in which the droplet suction occurs, is generated due to disturbance or the like, and there are many cases where the operation state is eliminated in a case where the transient state is stabilized by waiting for a certain period of time. Due to the control performed in steps S16 to S19 (in a case where control is not performed on the expansion valve 4, steps S16 to S18), it is possible to eliminate the operation state in which the droplet suction occurs without making the situation worse by performing unnecessary control. It is possible to prevent false surging detection, so that it is possible to prevent unnecessary opening control from being performed on the bypass valve 7.

(Control when Surging is Detected)

In a case where the abnormality detection unit 82 detects the occurrence of the surging, the protection control unit 83 performs control to forcibly open the bypass valve 7 (step S21). Specifically, the protection control unit 83 instructs the bypass valve control unit 84, for example, to increase the opening degree of the bypass valve 7 to a predetermined value. The bypass valve control unit 84 increases (for example, fully opens) the opening degree of the bypass valve 7. A diameter of the bypass pipe 6 is designed so that it is possible to eliminate the surging in a case where the bypass valve 7 is fully opened. Therefore, in a case where the opening degree of the bypass valve 7 is set to 100% according to the instruction of the protection control unit 83, the air volume increases and the surging that occurs in any of the compressors 2A and 2B is eliminated.

In a case where the control is performed to forcibly open the bypass valve 7, the protection control unit 83 subsequently determines whether or not to continue a state in which the absolute value of the deviation between the current values Ia and Ib acquired by the sensor information acquisition unit 81 is equal to or larger than the threshold value β (step S22). In a case where the absolute value of the deviation between the current values Ia and Ib is smaller than the threshold value β (step S22; No), the protection control unit 83 determines that the surging in the compressor 2 is eliminated. Since the abnormal operation state is eliminated, the control device 8 repeats the processes subsequent to step S11.

In a case where the absolute value of the deviation between the current values Ia and Ib is equal to or larger than the threshold value β (step S22; Yes), the protection control unit 83 refers to the timer 86 and determines whether or not a predetermined time T2 elapses after the occurrence of the surging is detected by the abnormality detection unit 82 (step S23). In the predetermined time T2, a time, which is required to eliminate the surging confirmed in an experiment or the like, is set. In a case where the predetermined time T2 does not elapse (step S23; No), the processes subsequent to step S22 are repeated. In a case where the predetermined time T2 elapses (step S23; Yes), it is considered that an abnormality other than the surging such as a failure of the sensor such as the ammeter a occurs, so that the protection control unit 83 clears the opening degree of the bypass valve 7 (Step S24). The clearing of the opening degree of the bypass valve 7 indicates returning to the opening degree immediately before the forcible opening control is performed in step S21. This means that, in a case where the surging occurs, the surging is eliminated by the forcible opening control performed on the bypass valve 7 (as being designed). However, in a case where the surging is not eliminated, it is considered that another abnormality occurs, and, in this case, it is not appropriate to continue a state in which the opening degree of the bypass valve 7 is large. The opening degree of the bypass valve 7 is controlled according to a predetermined rule even in a case of the normal operation, and is set to, for example, a value according to the operation point of the compressor 2. The protection control unit 83 controls the opening degree of the bypass valve 7 to the value. In addition to the process of clearing the bypass valve 7, the protection control unit 83 may notify an alarm or the like, which indicates that the failure of the sensor or the like is suspected.

When the occurrence of the surging is detected by the control in steps S21 to S24, it is possible to promptly eliminate the occurrence of the surging by performing the surging protection operation. In addition, it is possible to detect a situation in which the abnormality other than the surging is suspected.

The process represented in FIG. 4 is repeatedly executed at a predetermined control cycle while the compressor 2 is in operation.

Here, for comparison, a surging determination process by a control device according to the related art and a flow of a protection operation will be described using the configuration of FIG. 1 as an example. The control device according to the related art is described as a control device 8'.

Figure 5:
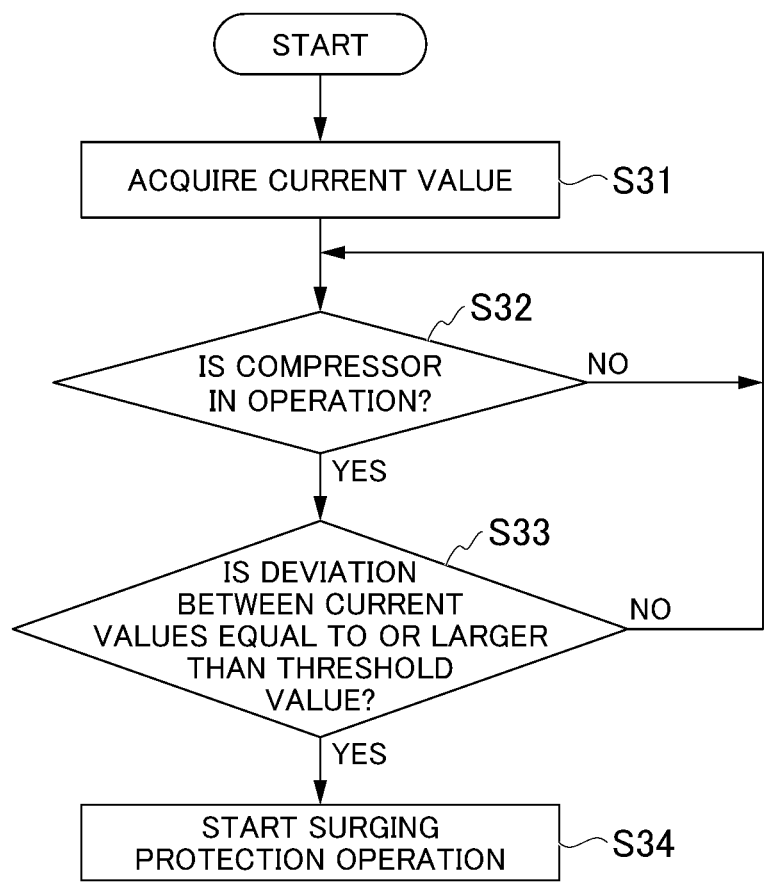
FIG. 5 is a flowchart showing surging determination and a protection operation by a control device according to the related art.

FIG. 5 is a flowchart showing the surging determination and the protection operation by the control device according to the related art.

First, the control device 8' acquires the current value Ia and the current value Ib (step S31). The control device 8' continues to acquire the current values Ia and Ib at predetermined time intervals thereafter.

Next, the control device 8' determines whether or not the compressor 2 is in operation (step S32). In a case where the compressor 2 is in operation, the following process is performed.

The control device 8' determines whether or not the absolute value (|Ia−Ib|) of the deviation between the current values Ia and Ib is equal to or larger than the predetermined threshold value β (step S33). In a case where the absolute value of the deviation between the current values Ia and Ib is smaller than the threshold value β (step S33; No), the processes subsequent to step S32 are repeated.

In a case where the absolute value of the deviation between the current values Ia and Ib is equal to or larger than the threshold value β (step S33; Yes), there is a possibility that the surging occurs in the compressor 2, and thus the surging protection operation is started (S34). Specifically, the control device 8' performs opening control on the bypass valve 7. Thereafter, the control device 8' continues the surging protection operation until, for example, the absolute value of the deviation between the current values Ia and Ib becomes smaller than the threshold value β.

In a case of the control represented in FIG. 5, it is not possible to correct the abnormal operation state of the compressor 2 in a case where the droplet suction actually occurs in the compressor 2 instead of the surging. As a result, there is a possibility that the refrigerator 1 have to be stopped. Next, a phenomenon that occurs in the refrigerator 1 due to control represented in FIG. 5 according to the related art will be described with reference to FIG. 6.

Figure 6:
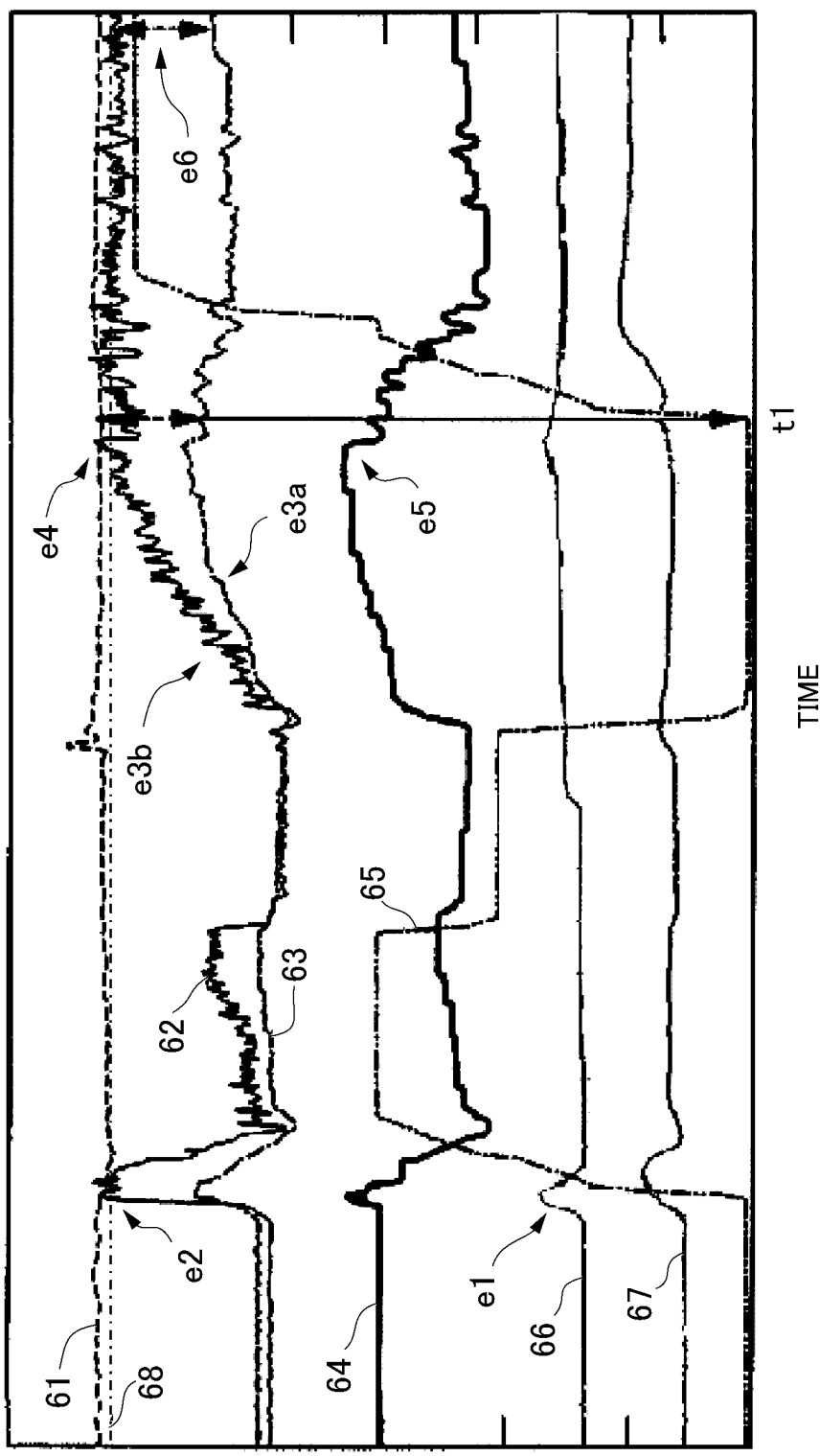
FIG. 6 is a graph showing a relationship between bypass valve control by the control device according to the related art and current values flowing through electric motors.

FIG. 6 is a graph showing a relationship between the bypass valve control by the control device according to the related art and the current values flowing through the electric motors.

Each of graphs 61 to 67 of FIG. 6 represents transition in a state quantity measured in a case where a disturbance occurs in the operation of the refrigerator 1 and a control quantity (valve opening degree and the like) output by the control device 8'. A vertical axis of the graph of FIG. 6 represents magnitude of the state quantity and the control quantity, and a horizontal axis represents elapse of time. Graph 61 represents a cold water flow rate. Graph 62 represents the current value Ib of the electric motor that drives the compressor 2B, and graph 63 represents the current value Ia of the electric motor that drives the compressor 2A. Graph 64 represents the opening degree of the vane 9 (vane 9A and vane 9B), and graph 65 represents the opening degree of the bypass valve 7. Graph 66 represents the inlet temperature of cold water, and graph 67 represents the outlet temperature of cold water. Graph 68 represents a current limit value imposed on the current values Ia and Ib. The control device 8' performs control to close the vane 9 in a case where the current values Ia and Ib exceed the current limit value. In a case where the opening degree of the vane 9 decreases, the current values Ia and Ib also decrease.

First, the inlet temperature of cold water rises due to the disturbance or the like (e1). Due to this effect, the outlet temperature of cold water also rises. As the outlet temperature of cold water rises, the control device 8' performs control to increase the opening degree of the expansion valve 4. Then, the amount of the refrigerant in the evaporator 5 increases. In the evaporator 5, for example, it is assumed that the liquid level is uneven so that the liquid phase refrigerant is easily supplied to the side of the compressor 2B. As the amount of refrigerant in the evaporator 5 increases, the droplet suction occurs in the compressor 2B, and the current value Ib exceeds the limit value (e2). Then, the control device 8' performs control to forcibly close the vane 9 (graph 64) and forcibly open the bypass valve 7 based on a fact that the deviation between the current values Ia and Ib becomes equal to or larger than the threshold value β (graph 65). Thereafter, due to the decrease in the current value Ib, the control device 8' temporarily stops the surging protection operation. In a case where the bypass valve 7 is fully closed due to the stop of the surging protection operation, the load on the electric motor increases. As the load increases, both the current values Ia and Ib rise (e3a, e3b).

Thereafter, the droplet suction occurs again in the compressor 2B, and the current value Ib exceeds the current limit value again (e4). Then, the control device 8' performs control to forcibly close the vane 9 (e5). The droplet suction does not occur in the compressor 2A, and the close control is performed on the vane 9, so that the current value Ia decreases. Despite the close control performed on the vane 9, the current value Ib of the compressor 2B does not decrease due to the load by the droplet suction. Then, the deviation between the current value Ia and the current value Ib gradually increases, and at time t1, the deviation exceeds the threshold value β. Then, the control device 8' starts the surging protection operation. That is, the control device 8' forcibly opens the bypass valve 7. In a case where the bypass valve 7 is opened and the vapor phase refrigerant is inhaled into the compressor 2 via the bypass pipe 6 and the evaporator 5, the droplet suction in the compressor 2B is promoted due to the increase in the air volume. As a result, the current value Ib is maintained at a high value, and the deviation between the current value Ia and the current value Ib does not return to the state of being smaller than the threshold value β (e6). As a result, in the example, it is necessary to temporarily stop the refrigerator 1, and it is not possible to perform a continuous operation. In general, there is a high possibility that the droplet suction in the compressor 2B is a temporary phenomenon caused by transient fluctuations in cold water flowing through the pipe 12 and cooling water flowing through the pipe 11. In a case where cold water or cooling water is stable, the droplet suction is also settled, and the deviation between the current value Ia and the current value Ib returns in a specified value (smaller than the threshold value β).

According to the control device 8 of the present embodiment, the droplet suction is detected without performing the false surging detection at time t1 by the process of the flowchart described with reference to FIG. 4. Then, the control device 8 continues the follow-up observation after detecting the droplet suction. Eventually, in a case where the operation state of the refrigerator 1 (the state of cold water or cooling water) is stable, the droplet suction from the compressor 2B is settled, and it is possible to perform the continuous operation without stopping the refrigerator 1. In addition, in a case where the surging protection operation is mistakenly performed, the droplet suction is continued in the compressor 2B, and thus there is a problem in that damage to equipment occurs. However, according to the abnormality detection process of the present embodiment and the control in a case where the abnormality detection is performed, it is possible to prevent damage to the equipment.

In the related art, in the parallel refrigerator 1, the abnormal operation state is often detected only by the deviation between respective current values flowing through the electric motors that drive the plurality of compressors 2. In such a detection method, false detection occurs, so that there is a case where it is difficult for the refrigerator 1 to return to the normal operation state. On the other hand, according to the control device 8 of the present embodiment, in a case where the deviation between the current values flowing through the electric motors that drives each of the plurality of compressors, is equal to or larger than the predetermined threshold value β, it is possible to accurately detect the surging which occurs in a part of the plurality of compressors 2 and the droplet suction from the evaporator 5 based on a relationship between the compression ratio and the air volume of the operation point with respect to the characteristic curve, which is represented by the compression ratio and the air volume of the plurality of compressors. The control device 8 performs control suitable for each event according to the surging and the droplet suction. Therefore, it is possible to prevent the false detection that the surging occurs despite the occurrence of the droplet suction from be performed, and an emergency stop of the refrigerator 1 due to the false protection control or failure of the equipment from being caused. On the contrary, it is possible to prevent the false detection that the droplet suction occurs despite the occurrence of the surging from being performed and the surging from being continued.

In addition, according to the present embodiment, in a case where the occurrence of the surging is detected, it is possible to promptly suppress the surging by the forcible opening control performed on the bypass valve 7. In addition, in a case where the deviation between the current values does not converge into the threshold value regardless that the surging protection operation is appropriately performed, another abnormality (sensor abnormality or the like) is suspected. However, according to the control device 8, it is possible to detect such a possibility.

In addition, in a case where the droplet suction occurs, the follow-up observation is performed until a transient state of cold water, cooling water, or the like is settled, so that it is possible to eliminate the droplet suction state without causing fluctuation to occur in a system because unnecessary control is performed.

In addition, according to a droplet suction detection method of the present embodiment, it is possible to accurately detect the droplet suction operation state that may occur in the parallel refrigerator provided with a plurality of compressors at a part of the compressors (not all the compressors).

In the above embodiment, the control device 8 detects both the surging and the droplet suction. However, for example, in a case where the droplet suction is detected by another detection method, the control device 8 may be configured as a control device mounted with only the above-described surging detection function and the surging protection operation function. Similarly, in a case where only the droplet suction detection and control when the droplet suction detection are necessary, the control device 8 may be configured as a control device mounted with only the above-described droplet suction detection function and the function of executing subsequent control (steps S16 to S19).

The control device 8 is mounted on a computer including a processor, such as a Central Processing Unit (CPU), a main storage device, an auxiliary storage device, an input and output interface, a communication interface, and the like. Then, an operation of each of the above-described functional units is stored in the auxiliary storage device in the form of a program. The CPU reads the program from the auxiliary storage device, expands the program to the main storage device, and executes the above process according to the program. The CPU secures a storage area in the main storage device according to the program. The CPU secures the storage area for storing data being processed in the auxiliary storage device according to the program.

In addition, it is possible to replace the components in the above-described embodiment with well-known components without departing from the gist of the present invention. The technical scope of the present invention is not limited to the above-described embodiment, and it is possible to add various modifications without departing from the gist of the present invention.

For example, a configuration may be provided in which the function of the control device 8 according to the present embodiment is provided in a device different from the control device that executes the normal operation of the refrigerator 1. The other end of the bypass pipe 6 may be connected to the suction side of the compressor 2 and a downstream of a refrigerant flow of the evaporator 5. The deviation between the current value Ia and the current value Ib may be calculated based on an average value of the current value Ia and the current value Ib measured at a predetermined time. Similarly, the operation point of the compressor 2 may be calculated by averaging the values measured by the first sensor to the fifth sensor measured at the predetermined time and the function a.

In addition, in the case of a parallel refrigerator in which three or more compressors are connected in parallel, a set in which two of the plurality of compressors are combined is generated for all combinations, and the abnormality detection process may be executed for each one set for all the combinations. Therefore, it is possible to apply the abnormality detection process of the present embodiment and the subsequent protection control to the refrigerator provided with three or more compressors.

INDUSTRIAL APPLICABILITY

According to the control device, the refrigerator, the control method, and the determination method described above, a surging detection accuracy is improved, so that it is possible to prevent an unnecessary surging protection control operation.

REFERENCE SIGNS LIST

1 Refrigerator
2, 2A, 2B Compressor
3 Condenser
4 Expansion valve
Evaporator
6 Bypass pipe
7 Bypass valve
8 Control device 9 Vane
11, 12 Pipe
81 Sensor information acquisition unit
82 Abnormality detection unit
83 Protection control unit
84 Bypass valve control unit
85 Expansion valve control unit
86 Timer
87 Storage unit

What is claimed here is:

1. A controller for a refrigerator provided with a plurality of compressors connected in parallel,
wherein the controller detects occurrence of surging and occurrence of droplet suction, while distinguishing the surging from the droplet suction, on the basis of a deviation between values of currents flowing through electric motors that are configured to drive each of the plurality of compressors, and an operation point indicated by an air volume and a compression ratio of the plurality of compressors.

2. The controller according to claim 1, wherein
the controller is configured to determine that the surging occurs in at least one of the plurality of compressors when the deviation between the values of currents is equal to or larger than a predetermined threshold value and the operation point indicates that the air volume is smaller than a predetermined reference.

3. The controller according to claim 2, wherein
the refrigerator is configured to include a bypass pipe that connects together a discharge side and a suction side of the plurality of compressors, and a bypass valve that is provided in the bypass pipe, and
when the occurrence of the surging is detected by an abnormality detector, control to open the bypass valve is performed by a protection controller.

4. The controller according to claim 2, wherein
the controller is configured to determine that the droplet suction occurs in at least one of the plurality of compressors from an evaporator provided in the refrigerator when the deviation between the values of currents is equal to or larger than the predetermined threshold value and the operation point indicates that the air volume is larger than the predetermined reference.

5. The controller according to claim 2, wherein
the controller is configured to maintain a current operation until the deviation between the values of currents becomes smaller than the predetermined threshold value when the occurrence of the droplet suction is detected.

6. The controller according to claim 1, wherein
the refrigerator is configured to include a bypass pipe that connects together a discharge side and a suction side of the plurality of compressors, and a bypass valve that is provided in the bypass pipe, and
when the occurrence of the surging is detected by an abnormality detector, control to open the bypass valve is performed by a protection controller.

7. The controller according to claim 6, wherein
when a state in which the deviation between the values of currents becomes equal to or larger than a predetermined threshold value continues even though a predetermined time elapses after the occurrence of the surging is detected by the abnormality detector, the control to open the bypass valve is stopped by the protection controller.

8. The controller according to claim 7, wherein
the controller is configured to determine that the droplet suction occurs in at least one of the plurality of compressors from an evaporator provided in the refrigerator when the deviation between the values of currents is equal to or larger than the predetermined threshold value and the operation point indicates that the air volume is larger than the predetermined reference.

9. The controller according to claim 7, wherein
the controller is configured to maintain a current operation until the deviation between the values of currents becomes smaller than the predetermined threshold value when the occurrence of the droplet suction is detected.

10. The controller according to claim 6, wherein
the controller is configured to determine that the droplet suction occurs in at least one of the plurality of compressors from an evaporator provided in the refrigerator when the deviation between the values of currents is equal to or larger than the predetermined threshold value and the operation point indicates that the air volume is larger than the predetermined reference.

11. The controller according to claim 6, wherein
the controller is configured to maintain a current operation until the deviation between the values of currents becomes smaller than the predetermined threshold value when the occurrence of the droplet suction is detected.

12. The controller according to claim 1, wherein
the controller is configured to determine that the droplet suction occurs in at least one of the plurality of compressors from an evaporator provided in the refrigerator when the deviation between the values of currents is equal to or larger than a predetermined threshold value and the operation point indicates that the air volume is larger than the predetermined reference.

13. The controller according to claim 1, wherein
the controller is configured to maintain a current operation until the deviation between the values of currents becomes smaller than a predetermined threshold value when the occurrence of the droplet suction is detected.

14. The controller according to claim 1, wherein
the controller is configured to decrease an opening degree of an expansion valve included in the refrigerator when the deviation between the values of currents does not become smaller than a predetermined threshold value even though a predetermined time elapses after the occurrence of the droplet suction is detected.

15. A refrigerator provided with a plurality of compressors connected in parallel, the refrigerator comprising:
a controller that detects occurrence of surging and occurrence of droplet suction, while distinguishing the surging from the droplet suction, on the basis of a deviation between values of currents flowing through electric motors that are configured to drive each of the plurality of compressors, and an operation point indicated by an air volume and a compression ratio of the plurality of compressors.

16. A controller for a refrigerator provided with a plurality of compressors connected in parallel, wherein
the controller determines that surging, and not droplet suction, occurs in at least one of the plurality of compressors when a deviation between values of currents flowing through electric motors that are configured to drive each of the plurality of compressors, is equal to or larger than a predetermined threshold value, and an operation point indicated by an air volume and a compression ratio of the plurality of compressors indicates that the air volume is smaller than a predetermined reference.

17. A controller for a refrigerator provided with a plurality of compressors connected in parallel, wherein
the controller determines that droplet suction, and not surging, occurs in at least one of the plurality of compressors from an evaporator provided in the refrigerator when a deviation between values of currents flowing through electric motors that are configured to drive each of the plurality of compressors, is equal to or larger than a predetermined threshold value, and an operation point indicated by an air volume and a compression ratio of the plurality of compressors indicates that the air volume is larger than a predetermined reference.

18. A control method for a refrigerator provided with a plurality of compressors connected in parallel, the control method comprising:
acquiring values of currents flowing through electric motors that are configured to drive each of the plurality of compressors;
calculating an operation point indicated by an air volume and a compression ratio of the plurality of compressors;
detecting occurrence of surging or droplet suction, while distinguishing the surging from the droplet suction, on the basis of a deviation between a plurality of the values of currents and the operation point;
performing a predetermined surging protection operation when the occurrence of the surging is detected; and
maintaining a current operation state when the droplet suction is detected.

19. An abnormality detection method for a refrigerator provided with a plurality of compressors connected in parallel, the abnormality detection method comprising:
acquiring values of currents flowing through electric motors that are configured to drive each of the plurality of compressors;
calculating an operation point indicated by an air volume and a compression ratio of the plurality of compressors; and
determining that surging, and not droplet suction, occurs in at least one of the plurality of compressors when a deviation between a plurality of the values of currents is equal to or larger than a predetermined threshold value and the operation point indicates that the air volume is smaller than a predetermined reference.

20. An abnormality detection method for a refrigerator provided with a plurality of compressors connected in parallel, the abnormality detection method comprising:
acquiring values of currents flowing through electric motors that are configured to drive each of the plurality of compressors;
calculating an operation point indicated by an air volume and a compression ratio of the plurality of compressors; and
determining that droplet suction, not surging, occurs in at least one of the plurality of compressors when a deviation between a plurality of the values of currents is equal to or larger than a predetermined threshold value and the operation point indicates that the air volume is larger than a predetermined reference.

* * * * *